United States Patent
Fritz et al.

(10) Patent No.: US 11,504,735 B2
(45) Date of Patent: Nov. 22, 2022

(54) COATING DEVICE HAVING FIRST AND SECOND PRINTHEADS AND CORRESPONDING COATING PROCESS

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 16/468,691

(22) PCT Filed: Dec. 1, 2017

(86) PCT No.: PCT/EP2017/081108
§ 371 (c)(1),
(2) Date: Jun. 12, 2019

(87) PCT Pub. No.: WO2018/108568
PCT Pub. Date: Jun. 21, 2018

(65) Prior Publication Data
US 2019/0337006 A1   Nov. 7, 2019

(30) Foreign Application Priority Data

Dec. 14, 2016   (DE) .................... 10 2016 014 955.8

(51) Int. Cl.
*B05B 15/555*   (2018.01)
*B05B 12/14*    (2006.01)
(Continued)

(52) U.S. Cl.
CPC ............... *B05B 15/58* (2018.02); *B05B 1/16* (2013.01); *B05B 12/14* (2013.01); *B05B 12/149* (2013.01);
(Continued)

(58) Field of Classification Search
None
See application file for complete search history.

(56) References Cited

U.S. PATENT DOCUMENTS 3,421,694 A   1/1969   Muller
3,717,306 A   2/1973   Hushon et al.
(Continued)

FOREIGN PATENT DOCUMENTS

CN   2287527 Y   8/1998
CN   1331661 A   1/2002
(Continued)

OTHER PUBLICATIONS

China National Intellectual Property Administration Office Action and Search Report for CN Application No. 201780077018.3 dated Aug. 27, 2020 (11 pages; Search Report in English).
(Continued)

*Primary Examiner* — Binu Thomas
(74) *Attorney, Agent, or Firm* — Bejin Bieneman PLC

(57) ABSTRACT

The disclosure concerns a coating device and a corresponding coating process for coating components, in particular motor vehicle body components, with a coating agent (e.g. paint), with a coating robot with a first printhead which is mounted on the coating robot. The disclosure provides that the first printhead is exchangeably mounted on the coating robot and can be exchanged for a second printhead during a color change. Another variant of the disclosure, on the other hand, provides for a second printhead to be mounted on the coating robot in addition to the first printhead, the two
(Continued)

printheads each applying a specific coating agent in order to enable a color change without changing the printhead.

16 Claims, 6 Drawing Sheets

(51) Int. Cl.
| | |
|---|---|
| *B05B 13/04* | (2006.01) |
| *B41J 3/407* | (2006.01) |
| *B25J 11/00* | (2006.01) |
| *B05B 15/58* | (2018.01) |
| *B05B 15/531* | (2018.01) |
| *B05B 1/16* | (2006.01) |
| *B41J 3/54* | (2006.01) |
| *B05B 15/55* | (2018.01) |

(52) U.S. Cl.
CPC ........ *B05B 13/0452* (2013.01); *B05B 15/531* (2018.02); *B05B 15/55* (2018.02); *B05B 15/555* (2018.02); *B25J 11/0075* (2013.01); *B41J 3/4073* (2013.01); *B41J 3/543* (2013.01)

(56) References Cited

U.S. PATENT DOCUMENTS

| | | | |
|---|---|---|---|
| 3,981,320 | A | 9/1976 | Wiggins |
| 4,141,231 | A | 2/1979 | Kudlich |
| 4,375,865 | A * | 3/1983 | Springer ................. B05B 12/14 118/302 |
| 4,383,264 | A | 5/1983 | Lewis |
| 4,423,999 | A | 1/1984 | Choly |
| 4,430,010 | A | 2/1984 | Zrenner et al. |
| 4,435,719 | A | 3/1984 | Snaper |
| 4,478,241 | A | 10/1984 | Cardenas-Franco |
| 4,555,719 | A | 11/1985 | Arway et al. |
| 4,593,360 | A | 6/1986 | Cocks |
| 4,668,948 | A | 5/1987 | Merkel |
| 4,714,044 | A | 12/1987 | Kikuchi |
| 4,734,711 | A * | 3/1988 | Piatt ........................ B41J 2/175 137/12 |
| 4,826,135 | A | 5/1989 | Mielke |
| 4,894,252 | A | 1/1990 | Bongen et al. |
| 4,941,778 | A | 7/1990 | Lehmann |
| 4,974,780 | A | 12/1990 | Nakamura et al. |
| 4,985,715 | A | 1/1991 | Cyphert et al. |
| 5,050,533 | A | 9/1991 | Zaber |
| 5,072,881 | A | 12/1991 | Taube, III |
| 5,429,682 | A | 7/1995 | Harlow, Jr. et al. |
| 5,435,884 | A | 7/1995 | Simmons et al. |
| 5,538,221 | A | 7/1996 | Joswig |
| 5,556,466 | A | 9/1996 | Martin et al. |
| 5,602,575 | A | 2/1997 | Pauly |
| 5,636,795 | A | 6/1997 | Sedgwick et al. |
| 5,647,542 | A | 7/1997 | Diana |
| 5,659,347 | A | 8/1997 | Taylor |
| 5,681,619 | A | 10/1997 | Ogasawara |
| 5,740,967 | A | 4/1998 | Simmons et al. |
| 5,843,515 | A | 12/1998 | Crum et al. |
| 5,951,882 | A | 9/1999 | Simmons et al. |
| 5,964,407 | A | 10/1999 | Sandkleiva |
| 5,976,343 | A | 11/1999 | Schlaak |
| 6,179,217 | B1 | 1/2001 | Yoshida et al. |
| 6,325,302 | B1 | 12/2001 | Guzowski |
| 6,540,835 | B2 | 4/2003 | Kim et al. |
| 6,607,145 | B1 | 8/2003 | Boriani et al. |
| 6,641,667 | B2 | 11/2003 | Ochiai et al. |
| 6,712,285 | B2 | 3/2004 | Provenaz et al. |
| 6,777,032 | B2 | 8/2004 | Ogasahara et al. |
| 6,811,807 | B1 | 11/2004 | Zimmermann et al. |
| 6,849,684 | B2 | 2/2005 | Poppe et al. |
| 7,160,105 | B2 | 1/2007 | Edwards |
| 7,178,742 | B2 | 2/2007 | Nellentine et al. |
| 7,182,815 | B2 | 2/2007 | Katagami et al. |
| 7,244,310 | B2 | 7/2007 | Edwards |
| 7,270,712 | B2 | 9/2007 | Edwards |
| 7,357,959 | B2 | 4/2008 | Bauer |
| 7,387,071 | B2 | 6/2008 | Heinke et al. |
| 7,449,070 | B2 | 11/2008 | Fellingham |
| 7,604,333 | B2 | 10/2009 | Horsnell |
| 7,757,632 | B2 | 7/2010 | Edwards |
| 7,837,071 | B2 | 11/2010 | Achrainer |
| 7,901,741 | B2 | 3/2011 | Katagami et al. |
| 8,028,651 | B2 | 10/2011 | Rademacher et al. |
| 8,118,385 | B2 | 2/2012 | Van De Wynckel et al. |
| 8,449,087 | B2 | 5/2013 | Kataoka et al. |
| 8,545,943 | B2 | 10/2013 | Frankenberger et al. |
| 8,652,581 | B2 | 2/2014 | Merchant |
| 8,678,535 | B2 | 3/2014 | Beier et al. |
| 8,875,655 | B2 | 11/2014 | Pettersson et al. |
| 8,882,242 | B2 | 11/2014 | Beier et al. |
| 9,010,899 | B2 | 4/2015 | Harjee et al. |
| 9,108,424 | B2 | 8/2015 | Wallsten et al. |
| 9,140,247 | B2 | 9/2015 | Herre et al. |
| 9,156,054 | B2 | 10/2015 | Ikushima |
| 9,266,353 | B2 | 2/2016 | Beier et al. |
| 9,393,787 | B2 | 7/2016 | Ikushima |
| 9,464,573 | B2 | 10/2016 | Remy et al. |
| 9,592,524 | B2 | 3/2017 | Fritz et al. |
| 9,701,143 | B2 | 7/2017 | Ikushima |
| 9,707,585 | B2 | 7/2017 | Reimert et al. |
| 9,844,792 | B2 | 12/2017 | Pettersson et al. |
| 9,901,945 | B2 | 2/2018 | Fehr et al. |
| 9,914,150 | B2 | 3/2018 | Pettersson et al. |
| 10,016,977 | B2 | 7/2018 | Stefani et al. |
| 10,105,946 | B2 | 10/2018 | Nakamura et al. |
| 10,150,304 | B2 | 12/2018 | Herre et al. |
| 10,252,552 | B2 | 4/2019 | Pitz et al. |
| 10,272,677 | B2 | 4/2019 | Stefani et al. |
| 10,532,569 | B2 | 1/2020 | Wallsten et al. |
| 2001/0006392 | A1 | 7/2001 | Otsuki |
| 2001/0017085 | A1 | 8/2001 | Kubo et al. |
| 2001/0019340 | A1 | 9/2001 | Kubo et al. |
| 2002/0024544 | A1 * | 2/2002 | Codos .................... B41J 3/4073 347/8 |
| 2002/0043280 | A1 | 4/2002 | Ochiai et al. |
| 2002/0043567 | A1 | 4/2002 | Provenaz et al. |
| 2002/0105688 | A1 | 8/2002 | Katagami et al. |
| 2002/0109741 | A1 | 8/2002 | Okabe et al. |
| 2002/0128371 | A1 | 9/2002 | Poppe et al. |
| 2003/0020783 | A1 | 1/2003 | Sanada |
| 2003/0041884 | A1 | 3/2003 | Bahr |
| 2003/0049383 | A1 | 3/2003 | Ogasahara et al. |
| 2004/0028830 | A1 | 2/2004 | Bauer |
| 2004/0089234 | A1 | 5/2004 | Hagglund et al. |
| 2004/0107900 | A1 | 6/2004 | Clifford et al. |
| 2004/0123159 | A1 | 6/2004 | Kerstens |
| 2004/0173144 | A1 | 9/2004 | Edwards |
| 2004/0221804 | A1 | 11/2004 | Zimmermann et al. |
| 2004/0231594 | A1 | 11/2004 | Edwards |
| 2004/0238522 | A1 | 12/2004 | Edwards |
| 2004/0256501 | A1 | 12/2004 | Mellentine et al. |
| 2004/0261700 | A1 | 12/2004 | Edwards |
| 2005/0000422 | A1 | 1/2005 | Edwards |
| 2005/0015050 | A1 | 1/2005 | Mowery et al. |
| 2005/0016451 | A1 | 1/2005 | Edwards |
| 2005/0023367 | A1 | 2/2005 | Reighard et al. |
| 2005/0156963 | A1 | 7/2005 | Song et al. |
| 2005/0243112 | A1 | 11/2005 | Kobayashi et al. |
| 2006/0061613 | A1 * | 3/2006 | Fienup ................. B41J 2/16538 347/19 |
| 2006/0068109 | A1 | 3/2006 | Frankenberger et al. |
| 2006/0146379 | A1 | 7/2006 | Katagami et al. |
| 2006/0238587 | A1 | 10/2006 | Horsnell |
| 2006/0251796 | A1 | 11/2006 | Fellingham |
| 2007/0062383 | A1 | 3/2007 | Gazeau |
| 2007/0292626 | A1 | 12/2007 | Larsson et al. |
| 2008/0271674 | A1 | 11/2008 | Rademarcher |
| 2008/0309698 | A1 | 12/2008 | Nakano et al. |
| 2009/0027433 | A1 | 1/2009 | Van De Wynckel et al. |
| 2009/0029069 | A1 | 1/2009 | Edwards |
| 2009/0117283 | A1 | 5/2009 | Herre |
| 2009/0181182 | A1 | 7/2009 | Sloan |

(56) References Cited

U.S. PATENT DOCUMENTS

| | | |
|---|---|---|
| 2010/0132612 A1 | 6/2010 | Achrainer |
| 2010/0156970 A1 | 6/2010 | Ikushima |
| 2010/0170918 A1 | 7/2010 | Achrainer |
| 2010/0225685 A1 | 9/2010 | Kwon et al. |
| 2010/0279013 A1 | 11/2010 | Frankenberger et al. |
| 2010/0282283 A1 | 11/2010 | Bauer |
| 2010/0321448 A1 | 12/2010 | Buestgens et al. |
| 2011/0014371 A1 | 1/2011 | Herre et al. |
| 2011/0084150 A1 | 4/2011 | Merchant |
| 2011/0248046 A1 | 10/2011 | Simion |
| 2011/0262622 A1* | 10/2011 | Herre .............. B41J 3/4073 118/300 |
| 2012/0085842 A1 | 4/2012 | Ciardella |
| 2012/0105522 A1 | 5/2012 | Wallsten |
| 2012/0114849 A1 | 5/2012 | Melcher |
| 2012/0162331 A1 | 6/2012 | Kataoka |
| 2012/0186518 A1 | 7/2012 | Herre |
| 2012/0219699 A1 | 8/2012 | Pettersson et al. |
| 2012/0249679 A1* | 10/2012 | Beier .................. B41J 2/25 347/40 |
| 2012/0282405 A1 | 11/2012 | Herre |
| 2013/0201243 A1 | 8/2013 | Yoshida |
| 2013/0215203 A1 | 8/2013 | Chen |
| 2013/0257984 A1 | 10/2013 | Beier et al. |
| 2013/0284833 A1* | 10/2013 | Fritz .............. B05B 13/0452 239/690 |
| 2014/0076985 A1 | 3/2014 | Pettersson et al. |
| 2014/0242285 A1 | 8/2014 | Pettersson et al. |
| 2014/0329001 A1 | 11/2014 | Rouaud et al. |
| 2015/0009254 A1 | 1/2015 | Kaiba et al. |
| 2015/0042716 A1 | 2/2015 | Beier et al. |
| 2015/0086723 A1 | 3/2015 | Bustgens |
| 2015/0098028 A1 | 4/2015 | Ohnishi |
| 2015/0328654 A1 | 11/2015 | Schwab |
| 2015/0375258 A1 | 12/2015 | Fritz et al. |
| 2015/0375507 A1 | 12/2015 | Ikushima |
| 2016/0052312 A1 | 2/2016 | Pitz et al. |
| 2016/0074822 A1 | 3/2016 | Han |
| 2016/0288552 A1 | 10/2016 | Ikushima |
| 2016/0306364 A1 | 10/2016 | Kushima et al. |
| 2017/0087837 A1 | 3/2017 | Stefani et al. |
| 2017/0106393 A1 | 4/2017 | Hamspon et al. |
| 2017/0136481 A1 | 5/2017 | Fritz et al. |
| 2017/0252765 A1* | 9/2017 | Medard ............... B05B 12/04 |
| 2017/0267002 A1 | 9/2017 | Pitz et al. |
| 2017/0299088 A1 | 10/2017 | Rau |
| 2017/0361346 A1 | 12/2017 | Lahidjanian et al. |
| 2018/0022105 A1 | 1/2018 | Nakamura et al. |
| 2018/0056670 A1* | 3/2018 | Kerr ................. B25J 11/0075 |
| 2018/0093491 A1 | 4/2018 | Murayama et al. |
| 2018/0178505 A1 | 6/2018 | Stefani et al. |
| 2018/0222186 A1 | 8/2018 | Stefani et al. |
| 2018/0250955 A1 | 9/2018 | Herre |
| 2019/0091712 A1 | 3/2019 | Medard et al. |

FOREIGN PATENT DOCUMENTS

| | | |
|---|---|---|
| CN | 1438942 A | 8/2003 |
| CN | 1512919 A | 7/2004 |
| CN | 1176815 C | 11/2004 |
| CN | 1668386 A | 9/2005 |
| CN | 1761530 A | 4/2006 |
| CN | 101264698 A | 9/2008 |
| CN | 101309755 A | 11/2008 |
| CN | 101657264 A | 2/2010 |
| CN | 101784348 A | 7/2010 |
| CN | 102177002 A | 9/2011 |
| CN | 102198434 A | 9/2011 |
| CN | 102971080 A | 3/2013 |
| CN | 103153483 A | 6/2013 |
| CN | 103909743 A | 7/2014 |
| CN | 104613205 A | 5/2015 |
| CN | 104994966 A | 10/2015 |
| CN | 105358259 A | 2/2016 |
| CN | 205042649 U | 2/2016 |
| CN | 106414081 A | 2/2017 |
| DE | 1284250 A | 11/1968 |
| DE | 7710895 U1 | 9/1977 |
| DE | 3045401 A1 | 7/1982 |
| DE | 3221327 A1 | 9/1983 |
| DE | 3225554 A1 | 1/1984 |
| DE | 3634747 A1 | 8/1987 |
| DE | 3804092 A1 | 9/1988 |
| DE | 4013322 A1 | 10/1991 |
| DE | 4115111 A1 | 11/1991 |
| DE | 4138491 A1 | 5/1993 |
| DE | 9405600 U1 | 6/1994 |
| DE | 68924202 T2 | 2/1996 |
| DE | 19606716 C1 | 8/1997 |
| DE | 19630290 A1 | 1/1998 |
| DE | 19731829 A1 | 1/1999 |
| DE | 19743804 A1 | 4/1999 |
| DE | 9422327 U1 | 3/2000 |
| DE | 19852079 A1 | 5/2000 |
| DE | 19936790 A1 | 2/2001 |
| DE | 20017629 U1 | 3/2001 |
| DE | 10048749 A1 | 4/2002 |
| DE | 69429354 T2 | 5/2002 |
| DE | 69622407 T2 | 3/2003 |
| DE | 10307719 A1 | 9/2003 |
| DE | 60001898 T2 | 2/2004 |
| DE | 102004021223 A1 | 12/2004 |
| DE | 10331206 A1 | 1/2005 |
| DE | 102004034270 A1 | 2/2006 |
| DE | 102004044655 A1 | 3/2006 |
| DE | 102004049471 A1 | 4/2006 |
| DE | 60212523 T2 | 2/2007 |
| DE | 69836128 T2 | 8/2007 |
| DE | 60125369 T2 | 10/2007 |
| DE | 102006021623 A1 | 11/2007 |
| DE | 102006056051 A1 | 5/2008 |
| DE | 102007018877 A1 | 10/2008 |
| DE | 60132100 T2 | 12/2008 |
| DE | 102007037663 A1 | 2/2009 |
| DE | 10 2008 018 881 A1 | 9/2009 |
| DE | 102008053178 A1 | 5/2010 |
| DE | 102009029946 A1 | 12/2010 |
| DE | 102009038462 A1 | 3/2011 |
| DE | 102010004496 A1 | 7/2011 |
| DE | 102010019612 A1 | 11/2011 |
| DE | 102012006371 A1 | 7/2012 |
| DE | 102012005087 A1 | 10/2012 |
| DE | 102012005650 A1 | 9/2013 |
| DE | 102012212469 A | 1/2014 |
| DE | 102012109123 A1 | 3/2014 |
| DE | 202013101134 U1 | 6/2014 |
| DE | 102013002412 A1 | 8/2014 |
| DE | 102013011107 A1 | 8/2014 |
| DE | 102013205171 A1 | 9/2014 |
| DE | 102014006991 A1 | 12/2014 |
| DE | 102014007523 A1 | 11/2015 |
| DE | 102014008183 A1 | 12/2015 |
| DE | 10 2014 217 892 A1 | 3/2016 |
| DE | 102014012705 A1 | 3/2016 |
| DE | 102014013158 A1 | 3/2016 |
| DE | 10 2016 014 952 A1 | 6/2018 |
| EP | 0138322 A1 | 4/1985 |
| EP | 0297309 A2 | 1/1989 |
| EP | 0665106 A2 | 8/1995 |
| EP | 1120258 A2 | 8/2001 |
| EP | 1270086 A1 | 1/2003 |
| EP | 1764226 A1 | 3/2007 |
| EP | 1852733 A1 | 11/2007 |
| EP | 1884365 A1 | 2/2008 |
| EP | 1946846 A2 | 7/2008 |
| EP | 2002898 A1 | 12/2008 |
| EP | 2133154 A2 | 12/2009 |
| EP | 2151282 A1 | 2/2010 |
| EP | 2196267 A2 | 6/2010 |
| EP | 2380744 A2 | 10/2011 |
| EP | 2433716 A1 | 3/2012 |
| EP | 2468512 A1 | 6/2012 |
| EP | 2641661 A1 | 9/2013 |

(56) References Cited

FOREIGN PATENT DOCUMENTS

| | | |
|---|---|---|
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 236/7/1 A | 4/2002 |
| GB | 2507069 A | 4/2014 |
| JP | 35722070 A | 2/1982 |
| JP | 562116442 A | 5/1987 |
| JP | H04-106669 U | 9/1992 |
| JP | H0798171 B2 | 10/1995 |
| JP | H09192583 A | 7/1997 |
| JP | 2000158670 A | 6/2000 |
| JP | 2000317354 A | 11/2000 |
| JP | 2001129456 A | 5/2001 |
| JP | 2001157863 A | 6/2001 |
| JP | 2001239652 A | 9/2001 |
| JP | 2001300404 A | 10/2001 |
| JP | 2005501745 A | 1/2002 |
| JP | 2002361863 A | 12/2002 |
| JP | 2003506210 A | 2/2003 |
| JP | 2003136030 A | 5/2003 |
| JP | 2003164780 A | 6/2003 |
| JP | 2004142382 A | 5/2004 |
| JP | 2004528956 A | 9/2004 |
| JP | 2004337710 A | 12/2004 |
| JP | 2005526234 A | 9/2005 |
| JP | 2007021760 A | 2/2007 |
| JP | 2007152666 A | 6/2007 |
| JP | 2007520340 A | 7/2007 |
| JP | 2007245633 A | 9/2007 |
| JP | 2007289848 A | 11/2007 |
| JP | 2008110332 A | 5/2008 |
| JP | 2009006324 A | 1/2009 |
| JP | 2010528852 A | 8/2010 |
| JP | 2010531213 A | 9/2010 |
| JP | 2010531729 A | 9/2010 |
| JP | 2010241003 A | 10/2010 |
| JP | 2011206958 A | 10/2011 |
| JP | 2012011310 A | 1/2012 |
| JP | 2012506305 A | 3/2012 |
| JP | 2012135925 A | 7/2012 |
| JP | 2012206116 A | 10/2012 |
| JP | 2012228643 A | 11/2012 |
| JP | 2012228660 | 11/2012 |
| JP | 2013067179 A | 4/2013 |
| JP | 2013530816 A | 8/2013 |
| JP | 2013530816 B2 | 8/2013 |
| JP | 2013188706 A | 9/2013 |
| JP | 2014019140 A | 2/2014 |
| JP | 2014050832 A | 3/2014 |
| JP | 2014111307 A | 6/2014 |
| JP | 2015-009222 A | 1/2015 |
| JP | 2015027636 A | 2/2015 |
| JP | 2015096322 A | 5/2015 |
| JP | 2015520011 A | 7/2015 |
| JP | 2015193129 A | 11/2015 |
| JP | 2015535735 A | 12/2015 |
| JP | 2016507372 A | 3/2016 |
| JP | 2016526910 A | 9/2016 |
| JP | 2016175077 A | 10/2016 |
| JP | 2016175662 A | 10/2016 |
| JP | 2018012065 A | 1/2018 |
| JP | 2020513311 A | 5/2020 |
| JP | 2020513314 A | 5/2020 |
| WO | 8601775 A1 | 3/1986 |
| WO | 9856585 A1 | 12/1998 |
| WO | 02098576 A1 | 12/2002 |
| WO | 03021519 A1 | 3/2003 |
| WO | 2003062129 A2 | 7/2003 |
| WO | 2004048112 A1 | 6/2004 |
| WO | 2004085738 A2 | 10/2004 |
| WO | 2005016556 A1 | 2/2005 |
| WO | 2005075170 A1 | 8/2005 |
| WO | 2006022217 A1 | 3/2006 |
| WO | 2007121905 A1 | 11/2007 |
| WO | 2009019036 A1 | 2/2009 |
| WO | 2010046064 A1 | 4/2010 |
| WO | 2010146473 A1 | 12/2010 |
| WO | 2011044491 A1 | 4/2011 |
| WO | 2011128439 A1 | 10/2011 |
| WO | 2011138048 A1 | 11/2011 |
| WO | 2013121565 A1 | 8/2013 |
| WO | 2015071270 A1 | 5/2015 |
| WO | 2015096322 A1 | 7/2015 |
| WO | 2015186014 A1 | 12/2015 |
| WO | 2016-087016 A1 | 6/2016 |
| WO | 2016142510 A1 | 9/2016 |
| WO | 2016145000 A1 | 9/2016 |
| WO | 2017006245 A1 | 1/2017 |
| WO | 2017006246 A1 | 1/2017 |
| WO | 2018102846 | 6/2018 |
| WO | 2018102846 A1 | 6/2018 |
| WO | 2018108565 A1 | 6/2018 |

OTHER PUBLICATIONS

European Search Report for EP20170638.9 dated Sep. 14, 2020 (4 pages—English translation not available).
European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
European Search Report for Application No. 20157088.4 dated Jun. 15, 2020 (10 pages).
Ghasem, G. et al.; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/ Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).

(56) References Cited

OTHER PUBLICATIONS

International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
Non Final Office Action for U.S. Appl. No. 16/468,700 dated Dec. 1, 2020 (73 pages).
Final Office Action dated Mar. 19, 2021 for U.S. Appl. No. 16/468,696 (45 pages).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Non-Final Office Action dated Apr. 28, 2021 for U.S. Appl. No. 16/468,693 (109 pages).
Final Office Action dated Apr. 19, 2021 for U.S. Appl. No. 16/468,700 (62 pages).
EPO Examination Report for Application No. 201702818.1 dated Dec. 18, 2020 (with English machine translation; 6 pages).
Chinese Office Action and Search Report for CN201780077603.3 dated Oct. 12, 2020 (15 pages; English translation not available).
EPO Official Notification of Opposition for Application No. 17821803.8 dated Feb. 10, 2021 (64 pages; with English machine translation).
JPO Submission for JP2019-531096; submitted Dec. 21, 2020 (32 pages; with English translation).
JPO Submission for JP2019-531957; submitted Dec. 21, 2020 (21 pages; with English translation).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Notice of Allowance dated in U.S. Appl. No. 16/468,689 dated Jun. 2, 2021 (38 pages).
Final Office Action dated Jun. 11, 2021 for U.S. Appl. No. 16/468,701 (53 pages).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2—2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
JPO Decision to Grant dated Oct. 3, 2021 for Application No. JP2019-532113 (7 pages; with English machine translation).
Final Office Action dated Oct. 7, 2021 for U.S. Appl. No. 16/468,693 (58 pages).
Japenese Patent Office Notice of Reasons of Refusal for Application No. JP 2019-531967 dated Jun. 8, 2021 (8 pages; with English machine translation).
JPO Office Action dated Jul. 3, 2021 for Application No. JP2019-532024 (12 pages; with English machine translation).
Non-Final Office Action dated Aug. 27, 2021 for U.S. Appl. No. 16/468,695 (149 pages).
EPO Notification of Objection dated May 18, 2022 for Patent No. EP3718643, related to related application No. U.S. Appl. No. 16/468.693 (55 pages; with English machine translation).
JPO Decision to Grant in related application No. JP2019-532030 dated Dec. 1, 2022 (6 pages; English machine translation provided).
Non-Final Office Action for related U.S. Appl. No. 16/468,699 dated Mar. 9, 2022 (180 pages).
Chinese Office Action in related application No. CN201780077045.0 dated Jan. 29, 2022 (17 pages; English machine translation provided).
JPO Decision to Grant in related application JP2019-532012 dated Jan. 25, 2022 (6 pages; with English machine translation).
Non-Final Office Action dated Jan. 6, 2022 for related U.S. Appl. No. 16/468,701 (36 pages).
Non Final Office Action dated Nov. 23, 2021 for U.S. Appl. No. 16/468,694 (163 pages).
Non-Final Office Action dated Dec. 24, 2021 for related U.S. Appl. No. 16/468,693 (19 pages).
Final Office Action dated Aug. 17, 2022 for U.S. Appl. No. 16/468,699 (26 pages).

* cited by examiner

Rinsing into return

Rinsing through nozzles

Rinsing through coil tube

Rinsing back through nozzles

COATING DEVICE HAVING FIRST AND SECOND PRINTHEADS AND CORRESPONDING COATING PROCESS

CROSS-REFERENCE TO RELATED APPLICATIONS

This application is a national stage of, and claims priority to, Patent Cooperation Treaty Application No. PCT/EP2017/081108, filed on Dec. 1, 2017, which application claims priority to German Application No. DE 10 2016 014 955.8, filed on Dec. 14, 2016, which applications are hereby incorporated herein by reference in their entireties.

BACKGROUND

The disclosure concerns a coating device for coating components with a coating agent, in particular for painting vehicle body components with a paint. Furthermore, the disclosure concerns a corresponding operating method.

For the serial painting of car body components, rotary atomizers are usually used as application devices, which however have the disadvantage of a limited application efficiency, i.e. only a part of the applied paint is deposited on the components to be coated, while the rest of the applied paint must be disposed of as so-called overspray.

A newer development line, on the other hand, provides for so-called printheads as application devices, as known for example from DE 10 2013 002 412 A1, U.S. Pat. No. 9,108,424 B2 and DE 10 2010 019 612 A1. In contrast to the known rotary atomizers, such printheads do not emit a spray of the paint to be applied, but a narrowly confined jet of paint, which is almost completely deposited on the component to be painted, so that almost no overspray occurs.

However, the known printheads are not designed for a color change and are therefore only suitable to a very limited extent for the series painting of motor vehicle body components in a paint shop.

In addition, the coating in the printhead can become dry or dry out during coating breaks, which in the worst case can lead to a loss of function of the printhead.

Furthermore, regarding the general technical background of the disclosure, reference is made to DE 601 25 369 T2, DE 10 2010 019 612 A1, WO 2005/016556 A1, DE 698 36 128 T2, DE 10 2004 044 655 A1, DE 10 2013 205 171 A1, DE 600 01 898 T2, EP 1 946 846 A2, DE 10 2013 002 412 A1 and DE 689 24 202 T2.

DETAILED DESCRIPTION

Figure 1:
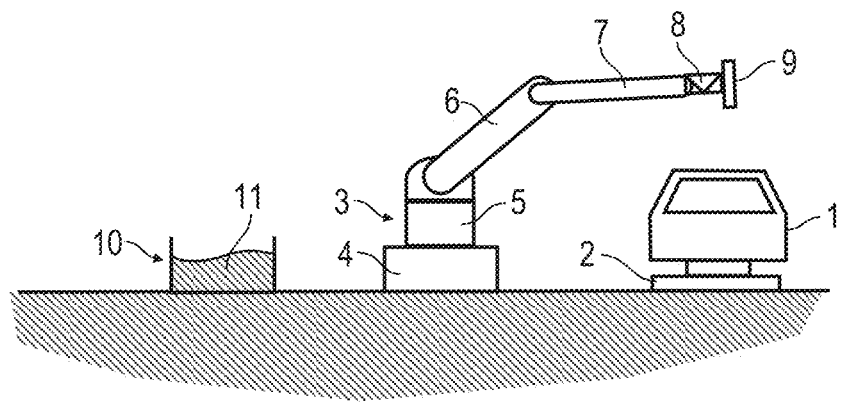
FIG. 1 a schematic, highly simplified representation of a coating device according to the disclosure with a painting robot with a printhead and a wet deposit device for deposition of the disassembled printhead.

The disclosure includes two examples, according to which the printhead is replaceably mounted on the coating robot or several printheads are mounted on the coating robot, each of which applies only one specific coating agent.

The coating device in accordance with the disclosure is preferably used to paint vehicle body components with a paint and is designed accordingly.

However, the disclosure also offers the alternative of coating other types of components.

Furthermore, the applied coating does not necessarily have to be paint (e.g. water-based paint, solvent-based paint, clear coat, basecoat, etc.). Rather, the disclosure-based coating device can also be designed for the application of other coating agents, such as adhesives, insulating materials, sealants, primers, etc., to name just a few examples.

In accordance with the state of the art, the coating device according to the disclosure initially has at least one multi-axis coating robot, which preferably has serial robot kinematics, at least six or seven movable robot axes and one multi-axis robot hand axis. Such coating robots are known from the state of the art and therefore do not need to be described in detail.

In addition, in accordance with the state of the art, the coating device according to the disclosure has at least one first printhead to apply the coating agent to the surface of the component to be coated. The printhead has at least one nozzle to deliver a coating agent jet of the coating agent onto the surface of the component to be coated. The term "printhead" used in the disclosure must therefore be distinguished from the atomizers usually used as application devices, which do not emit a spatially limited jet of coating agent but a spray of the coating agent. Otherwise, the term "printhead" used in the context of the disclosure is to be understood generally, so that different construction principles of known printheads can be used. Preferably, however, the printhead is similar to the printheads described in DE 10 2013 002 412 A1, U.S. Pat. No. 9,108,424 B2 and DE 10 2010 019 612 A1.

It should also be noted that the printhead has at least one printhead valve to control the release of coating agent through the nozzle. For example, this printhead valve may have an electrically actuated solenoid actuator to adjust the valve position, but the design and operation of such a printhead valve are state of the art and therefore do not need to be described in more detail.

The printhead is mounted on the coating robot and is program-controlled by the coating robot over the surface of the component to be coated, which is also known from the state of the art.

In the first example of the disclosure, the first printhead is mounted on the coating robot and can be exchanged for a second printhead during a color change, so that the printheads themselves do not have to undergo a color change, but can simply be exchanged by another printhead.

In the second example at least a second printhead is mounted on the coating robot in addition to the first printhead, whereby the two printheads each apply a specific coating agent in order to enable a color change without changing the printhead. The first printhead can then apply black paint, for example, while the second printhead can apply silver paint, for example.

In the first example described briefly above, a deposit device is preferably provided to deposit the first printhead disassembled by the coating robot in the deposit device and to pick up the second printhead from the deposit device instead of the deposited first printhead.

The deposit device is preferably arranged stationary in the coating device and can be reached by the coating robot, so that the coating robot can deposit the currently mounted printhead in the deposit device and pick up the other printhead previously located in the deposit device from the deposit device. In the case of a color change, the coating robot places the mounted printhead in the deposit device and picks up a new printhead from the deposit device so that the new color can then be applied with this new printhead.

The deposit device may be a wet deposit device or wet holding device in which the nozzles of the deposited printhead are kept moist to prevent the liquid coating from drying during storage.

The wet deposit device can also be realized in connection with a permanently mounted printhead, i.e. with a printhead that is not exchangeably mounted on the coating robot. The coating robot can then place the printhead in the wet deposit device during coating breaks (e.g. in shift pauses or during maintenance pauses) so that the coating in the printhead does not dry up.

In an example of such a wet deposit device, a liquid bath can be provided which is filled with a liquid (e.g. rinsing agent, thinner) and into which the printhead is at least partially immersed during deposition, whereby the liquid prevents the liquid coating agent from drying on the outside of the printhead during deposition. When immersing the printhead in the liquid bath, at least the printhead nozzles should be immersed in the liquid bath, as the nozzles have a very small nozzle cross section and can therefore clog relatively easily.

In another example, the wet deposit device allows fluid circulation through the deposited printhead. For this purpose, the printhead has an inlet and an outlet in addition to the nozzles so that a liquid (e.g. coating agent, rinsing agent) can circulate through the printhead. The wet deposit device then has a docking device that allows docking with circulation ports to the inlet and outlet of the deposited printhead so that the Wet Dispenser then circulates a liquid (e.g., coating or rinsing agent) through the deposited printhead. When the printhead is placed by the coating robot in the wet deposit device, the printhead is separated from the coating robot and the printhead is connected to the docking device in the wet deposit device.

The fluid circulation through the deposited printhead can be done with the previously used paint, so that the printhead is then ready to be picked up again by the coating robot for application with the same paint.

Alternatively, it is also possible to clean the deposited printhead with a rinsing agent and then pre-fill (i.e. fill) it with a different paint so that the printhead is ready for application with the new paint.

In the second example at least two printheads are mounted on the coating robot, which can be operated alternately. This also enables a so-called A/B operation, in which printhead A applies coating agent, while the other printhead B is rinsed with a rinsing agent and, if necessary, pre-filled with a different colored coating agent. Then coating agent is applied with the printhead B, while the printhead A is rinsed with rinsing agent and, if necessary, pre-filled with a coating agent of a different color. This A/B operation enables an uninterrupted coating during a color change, since you can switch from printhead A to printhead B or vice versa without a pause. The time required for rinsing and pre-filling the printhead does not interrupt the coating operation.

Furthermore, with the second example it is possible that the at least two printheads on the coating robot can each be supplied with coating agent by a separate coating agent circuit. In this example and in contrast to the A/B operation described above, no separate A/B valve or corresponding valve arrangement is required. However, the two coating circuits must then be routed through the coating robot to the two printheads.

It has already been mentioned briefly above that the second example has at least two printheads mounted on the coating robot, which can be operated selectively. Here one coating agent flows through each printhead. The number of printheads mounted on the coating robot is therefore preferably greater than 2, and smaller than 6. The individual printheads are then preferably connected to a separate coating agent supply line, so that the coating agent supply lines are only passed through by the associated coating agent.

With this second example there is also the possibility that some printheads are intended for frequently used coating agents ("high runner") and then only the associated frequently used coating agent flows through them without a color change being provided for these printheads. Another part of the printheads or even only one printhead is intended for the application of rarely used coating agents ("low runner") and allows a color change between the different rarely used coating agents. This allows the frequently used coating agents to avoid color change at all with corresponding losses. When applying the rarely used coating agents, a color change with corresponding losses is necessary, but this is of little importance, since the rare coating agents associated with color change losses are only rarely used.

In addition, the coating device according to the disclosure can have a time control to rinse the printheads time-controlled. For example, the time control can trigger a rinsing process after a specified rinse interval, for example after a rinse interval of 1 h, 2 h, or 4 h. In addition, there is the possibility that the time control triggers a rinsing process after a specified downtime of a conveyor conveying the components to be coated has elapsed, for example after a downtime of more than 10 minutes, 20 minutes, 30 minutes or 1 hour. These two variants of a time control can be used alone or in combination with each other.

In addition, the coating device according to the disclosure preferably includes a cleaning device to clean the mounted or dismounted printheads. State-of-the-art atomizer cleaning devices are known, into which the coating robot introduces the mounted rotary atomizer, whereby the rotary atomizer is then sprayed inside the cleaning device with a cleaning liquid (e.g. thinner) in order to clean the rotary atomizer from the outside. The cleaning device according to the disclosure can be constructed similarly, whereby the cleaning device is naturally adapted to the different outer contour of the printhead and to missing functions like e.g. shaping air.

The cleaning device may be located separately from the coating robot, but the cleaning device is located within the working area of the coating robot so that the coating robot can insert the printhead into the cleaning device.

In an example of the disclosure, the cleaning device and the deposit device form a uniform component. This means that the deposit device is not only used for depositing, picking up and temporarily storing the printheads, but also for cleaning the printheads in the deposited state and/or in the mounted state on the coating robot.

The disclosure preferably enables a very short color change time, which is preferably shorter than 1 h, 20 min, 10 min, 1 min, 30 s, 10 s or even shorter than 5 s.

In the case of stop-and-go conveying of the motor vehicle body components through the paint shop, the color change time is preferably shorter than the change time between two successive motor vehicle body components, i.e. shorter than the conveying time of the motor vehicle body components between two positions.

In the case of continuous line tracking conveying of the motor vehicle body components through the paint shop, however, the color change time is preferably shorter than the time interval between two successive motor vehicle body components. In A/B mode, the color change time can be extended to the duration of a car body cycle.

Another advantage is the low loss of coating agent during a color change, whereby the loss of coating agent is preferably less than 5 l, 2 l, 200 ml, 20 ml, 10 ml, 5 ml or even less than 2 ml.

In addition, a color change preferably results in a very low rinsing agent requirement, which is preferably less than 300 ml, 250 ml, 200 ml, 100 ml, 50 ml, 20 ml or even less than 10 ml.

In general it should be noted that the printheads preferably emit a narrowly limited jet of coating agent as opposed to a spray mist as is the case with conventional atomizers (e.g. rotary atomizers).

In a variant of the disclosure, the printheads each emit a droplet jet consisting of several droplets separated from each other in the longitudinal direction of the jet, as opposed to a jet of coating agent being continuous in the longitudinal direction of the jet.

Alternatively, it is also possible for the printheads to emit a continuous jet of coating agent in the longitudinal direction of the jet, as opposed to the droplet jet mentioned above.

In the case of the coating device in accordance with the disclosure, the coating agent pressure is preferably controlled with a very small fluctuation range, whereby the fluctuation range of the coating agent pressure is preferably smaller than 500 mbar, 200 mbar, 100 mbar or 50 mbar.

It should also be mentioned that the printheads preferably have a very high application efficiency of at least 80%, 90%, 95% or 99%, so that substantially all of the applied coating agent is completely deposited on the component without overspray. The printheads are therefore essentially overspray-free within the scope of the disclosure.

In addition, it should be noted that the printheads preferably have a sufficiently high surface coating performance to paint vehicle body components, for example. The surface coating performance is therefore preferably at least 0.5 $m^2$/min, 1 $m^2$/min, 2 $m^2$/min or even 3 $m^2$/min.

It should also be noted that the volume flow of the applied coating agent and thus the exit velocity of the coating agent are preferably adjusted so that the coating agent does not bounce off the component when it hits it. Furthermore, the impact velocity of the coating agent jet should be designed in such a way that the coating agent does not penetrate the underlying paint layer, but the coating agent lies on it (layers). The exit velocity of the coating agent is therefore preferably in the range of 5 m/s to 30 m/s. The coating agent is applied to the substrate at a speed of 5 m/s to 30 m/s. The coating agent is then applied to the substrate. The application distance is preferably in the range of 4 mm to 200 mm.

Finally, it should be mentioned that the control of the at least one printhead valve is preferably done by an electrically controllable actuator, for example by a magnetic actuator or a piezo actuator, whereby such actuators are known from the state of the art and therefore do not need to be described in detail.

It should also be mentioned that the disclosure does not only claim protection for the coating device described above. Rather, the disclosure also claims protection for a corresponding coating process, whereby most of the method steps already result from the above description, so that a separate description of the individual method steps can be dispensed with.

In addition, however, it should be mentioned that during a color change from a solvent-based paint to a water-based paint, it is preferable to first use a solvent-based rinsing agent, then optionally a release agent (e.g. alcohol) and then a water-based rinsing agent. If the change from a water-based to a solvent-based coating is reversed, this sequence must of course be reversed.

The disclosure also offers the possibility of sequential rinsing with different rinsing agents, for example with an increasing content of organic solvents.

It is also possible to use a universal rinsing agent for rinsing, which is used both for rinsing out water-based paint and for rinsing out solvent-based paint.

In addition, rinsing can be assisted by introducing pulsed air and/or an aerosol of compressed air and rinsing agent into the printhead and/or cleaning device.

It should also be mentioned that the rinsing agent can also be a VOC-free (VOC: Volatile Organic Compound).

In addition, it is advantageous if the residual liquids (e.g. old coating agent, rinsing agent residues, etc.) are collected and disposed of during a rinsing process in order to avoid contamination of the coating device.

The above applies both to flushing the media-carrying areas inside the printhead or printhead supply lines and to cleaning or flushing the printhead in the cleaning device.

In addition, it is advantageous if the printhead is pre-filled with the new coating agent after a rinsing process so that it is immediately available for application. When this is done, it is preferable to squeeze a defined amount of the new coating agent out of the printhead nozzles, whereby the squeezed out amount of coating agent is then preferably collected and disposed of. In practice, the pressure is probably applied only before application.

It has already been mentioned above that the printhead valve can be controlled by a solenoid actuator. Such solenoid actuators usually have an electric coil wound onto a coil tube, with an armature movably arranged in the coil tube and displaced depending on the current applied to the coil to close or open the nozzle. Here there is the possibility that coating agent can enter the coil tube. The coil tube of the magnetic actuator is therefore also preferably flushed during a rinsing process. Here it is possible that the rinsing agent is led through the coil tube through a separate rinsing connection in the direction of the nozzle. Conversely, it is also possible for the rinsing agent to flow in the opposite direction through the coil tube, i.e. to a separate flushing outlet. In addition, these two types of flushing can also be combined alternately.

Furthermore, the printhead can be flushed with rinsing agent through the return, i.e. the rinsing agent is introduced into the inlet of the printhead and then enters the return through the outlet of the printhead, whereby the nozzles are then preferably closed.

In addition, it is also possible for the rinsing agent to be introduced into the printhead through the inlet and then to exit through the nozzles when the printhead valves are open in order to flush the nozzle channels.

Furthermore, the disclosure also offers the possibility that the rinsing agent may remain at least partially as a barrier medium in the coil tube after a color change in order to prevent coating agent from entering the coil tube at all.

The second example involves designing the printhead in such a way that a color change is possible during coating operation. This is achieved by the fact that the printhead can be rinsed with a rinsing agent during a color change in order to rinse out coating agent residues from the printhead.

In accordance with the state of the art, the printhead according to the disclosure has a coating agent supply in order to supply the coating agent to be applied to the printhead. In addition, the disclosure printhead preferably also has a separate rinsing agent supply to supply a rinsing agent. It should be mentioned here that the coating agent supply is preferably separated from the rinsing agent supply, so that the printhead preferably has separate inlets for the supply of the coating agent on the one hand and for the supply of the rinsing agent on the other hand.

For a few colors, one color hose (coating agent supply) per color could be connected to the applicator (printhead) (Integrated Color Changer technology). Then there is a rinsing agent connection and a pulse air connection in or on the applicator. These are then used for rinsing.

In addition, the printhead according to the disclosure also preferentially has a recirculation system in order to return coating agents and/or rinsing agents, either to a ring line or to disposal. In addition to the separate connections for the supply of the coating agent and the rinsing agent, the printhead according to the disclosure also has a separate connection for returning the coating agent or the rinsing agent.

The recirculation flow to the recirculation is preferably controlled by a controllable recirculation valve, which can be either a self-actuated recirculation valve or a proportional valve. Such valve types are known from the state of the art and therefore do not need to be described in detail.

In an example of the disclosure, the printhead has several nozzles for dispensing the coating. A control valve is preferably assigned to each individual nozzle in order to control the release of the coating agent through the respective nozzle. The above mentioned rinsing agent supply then may have branch lines leading to the individual control valves so that all control valves of the pressure head can be flushed simultaneously with the rinsing agent.

The individual branch lines of the rinsing agent supply are preferably designed in such a way that the rinsing agent supplied is distributed evenly over the branch lines to the control valves so that the individual control valves are flushed essentially with the same amount of rinsing agent.

In an example of the disclosure, the printhead has at least one nozzle for dispensing the coating agent and an associated control valve for controlling the dispensing of the coating agent through the nozzle, as explained briefly above. The control valve can have an electric coil, which can be wound onto a coil tube, as in the case of the known design described above. It was already explained at the beginning about the state of the art that coating residues can be deposited in this coil tube, which on the one hand can impair the functionality of the control valve and on the other hand can prevent the color change capability. In the case of the printhead according to the disclosure, the rinsing agent supply line therefore preferably flows into the coil tube in order to flush the inside of the coil tube.

It should be mentioned here that the coil tube—as in the conventional control valve described above—preferably has a circular internal cross-section and contains a coil core. Here it can be advantageous if the coil core has a profile cross-section which does not completely fill the internal cross-section of the coil tube in order to leave space for the rinsing agent between the coil tube and the coil core so that the rinsing agent can flow through in the axial direction. For example, the coil core may have a star-shaped profile cross-section with radially projecting ribs running in the axial direction, so that the flushing medium can flow between the ribs of the coil core in the axial direction.

Alternatively, it is possible for the coil core to have a flushing groove in its circumferential surface that can run axially, in the circumferential direction or spirally, for example.

In addition, axial flushing channels can also be arranged in the coil core.

Another example shows that the profile cross-section of the coil core is grid-shaped and can be flowed through by the rinsing agent.

It should also be mentioned that the coil core is preferably sealed against the coil tube with a seal, in particular with a pressure resistance of more than 2 bar, 4 bar or 6 bar.

It has already been briefly mentioned above that the printhead may have several control valves, all of which can be flushed. The individual control valves usually have one coil tube each, whereby the rinsing agent supply then flows into all coil tubes in order to flush all coil tubes.

It should also be mentioned that the control valve usually has a movable armature, as in the known control valve described at the beginning, which is moved depending on the current supplied to the coil and closes or releases the nozzle depending on its position.

This armature may run coaxially on part of its length in the coil tube and preferably has an axially permeable profile cross-section so that flushing fluid can flow between the armature and the inner wall of the coil tube. For this purpose, the armature preferably has a non-circular profile cross-section which does not completely fill the circular internal cross-section of the coil tube and therefore permits an axial flow of rinsing agent. For example, the profile cross-section of the armature can be star-shaped or cross-shaped.

In an example, the rinsing agent supply flows axially between the armature and the coil core into the coil tube.

In another v example the rinsing agent supply opens in the axial direction in the area of the coil core into the coil tube, in particular at the end of the nozzle tube remote from the movable armature.

In another example, the movable armature is arranged in a guide cage permeable to flushing medium, in particular in a slotted cylinder. This offers the advantage that the movable armature can be flushed during a rinsing process, thus avoiding coating deposits on the armature.

In another v example, the sliding anchor has a central guide hole with a guide pin projecting into the guide hole. This results in a linear guide, which can also be flushed.

In another example, a flexible diaphragm is provided which separates the control valve from the coating agent supply so that the control valve is protected by the diaphragm against contact with a coating agent. This means that the control valve itself does not have to be flushed at all, as the control valve itself does not come into contact with the respective coating agent at all. Rather, only the smooth surface of the diaphragm on the coating side should be rinsed, which is, however, very easy and efficient since the smooth diaphragm surface hardly forms any starting points for paint deposits.

The printhead according to the disclosure preferably enables a fast color change within a color change time of less than 1 h, 20 min, 10 min, 30 s, 10 s or even less than 5 s.

The aim is to achieve the lowest possible paint change losses, which are preferably smaller than 5 l, 2 l, 200 ml, 20 ml, 10 ml, 5 ml or even smaller than 2 ml with the printhead according to the disclosure.

This also leads advantageously to a very lower rinsing agent consumption with a color change, whereby the rinsing agent consumption is preferably smaller than 10 l, 5 l, 2 l, 200 ml, 100 ml, 50 ml, 20 ml or even smaller than 10 ml.

The disclosure also allows the printhead to be equipped with several separate rinsing agent supplies to supply different rinsing agents, which can be adapted to the respective coating agent, for example.

It should also be mentioned that the printhead with its media-carrying parts is preferably designed in such a way that the media-carrying parts are free of dead space and/or undercuts in order to improve rinsability.

To improve rinsability, it is also possible for the printhead to be coated with an easy-to-clean coating on the surfaces that come into contact with the coating.

Furthermore, it should be noted that the disclosure does not only claim protection for the printhead according to the disclosure as described above as a single component or as a replacement part. Rather, the disclosure also claims protection for a complete coating device with such a printhead.

In addition, the coating device according to the disclosure preferably also includes a color changer, such as a linear color changer, a rotary color changer, a color changer integrated in the printhead or an A/B color changer. These types of color changers are known from the state of the art and therefore do not need to be described further.

Finally, the disclosure also includes a corresponding operating method for such a printhead, whereby the individual method steps already result from the above description and therefore do not need to be described in more detail.

However, it should be mentioned that the rinsing agent can be a universal rinsing agent that is suitable for both water-based and solvent-based coatings. In addition, the rinsing agent can be a VOC-free (VOC: volatile organic compounds) rinsing agent.

During the rinsing process, the printhead can also be rinsed together with the rinsing agent or alternately with pulsed air.

It is also possible to supply the printhead with an aerosol for rinsing.

The disclosure also offers the possibility of supplying the printhead with different rinsing agents one after the other.

In a variant of the operating method according to the disclosure, a solvent-based paint is first supplied and applied. The printhead is then rinsed with a solvent-based rinsing agent to rinse out residues of the solvent-based paint. An optional release agent can then be added, such as alcohol. In the next step, a water-based paint is added and applied. Finally, the printhead is rinsed with a water-based rinsing agent to rinse out any residues of the water-based paint.

The above description explains a change from a solvent-based coating to a water-based coating. Of course, it is also possible to switch from a water-based to a solvent-based coating, which requires a corresponding change in the sequence of the method steps described above.

After a color change, the printhead is preferably pre-filled with the new coating, i.e. filled. A defined amount of coating is preferably applied through the nozzle of the printhead.

When operating the printhead according to the disclosure, it is also possible that all fluids (coating agent and rinsing agent) released during a rinsing process are collected for disposal.

It is also possible for the outer surface of the nozzle head to be rinsed during the color change in order to remove any coating agent residues adhering to it.

It should also be mentioned that the rinsing agent can be discharged one after the other or alternately into the recirculation system or through the nozzle. In addition, there is also the option of rinsing with a mixture of rinsing agent and pulsed air.

FIG. 1 shows a very simplified, schematic representation of an painting installation according to the disclosure for painting vehicle body components 1, which are conveyed by a conveyor 2 at right angles to the drawing plane along a painting line through the painting installation, whereby the conveying can take place either in stop-and-go operation or in line tracking operation, which is known per se from the state of the art and therefore does not need to be described in more detail.

Next to the conveyor 2, a painting robot 3 is simplified, whereby the painting robot 3 has a robot base 4, a rotatable robot member 5, a proximal robot arm 6 ("arm 1"), a distal robot arm 7 ("arm 2") and a multi-axis robot hand axis 8, which is known from the state of the art. The robot base 4 can either be fixed here or moved along an unrepresented traversing rail at right angles to the drawing plane.

The rotatable robot member 5 can be rotated about a vertical axis of rotation relative to the robot base 4.

The proximal robot arm 6, on the other hand, can be swivelled about a horizontal swivel axis relative to the rotatable robot member 5.

The distal robot arm 7 can also be swivelled about a horizontal swivel axis relative to the proximal robot arm 6.

The robot hand axis 8 has a mounting flange on which a printhead 9 is mounted. The printhead 9 has a large number of nozzles to emit a jet of coating agent onto the surface of the motor vehicle body part 1.

In addition, the coating device shown has a wet deposit device 10 which is filled with a liquid bath 11, whereby the liquid may, for example, be a thinner. The liquid bath 11 may also contain a soaked pad or sponge as an alternative to moistening printhead 9.

During a color change, the coating robot 3 places the printhead 9 in the liquid bath 11 and takes another printhead from the wet deposit device 10, so that another paint can then be applied with the new printhead (not shown).

In addition, the coating robot 3 positions the printhead 9 in the liquid bath 11 during longer coating pauses to prevent the coating from drying in the nozzles of the printhead 9.

It should be mentioned that the drawing only shows a simplified schematic representation of this example.

Figure 2A:
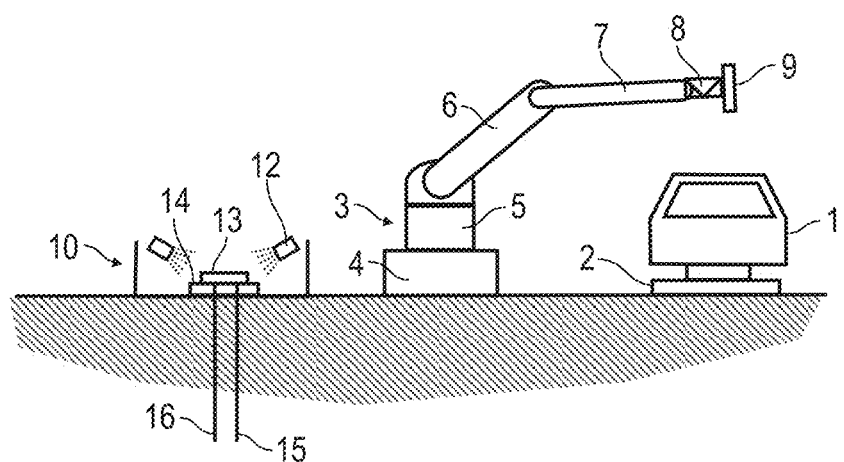
FIG. 2A is a modification of FIG. 1, in which a cleaning device is additionally provided to clean the deposited printhead from the outside and material circulation through the deposited printhead is possible, FIG. 2B a flowchart to illustrate a color change process with a storage of the old printhead and a pick-up of a new printhead, FIG. 3A a modification of FIG. 1 according to the second disclosure variant with two printheads on the coating robot, FIG. 3B a highly simplified fluid-technical equivalent circuit diagram of the coating device according to FIG. 3A with an A/B color changer, FIG. 3C a flow chart to illustrate the A/B operation of the coating device according to FIGS. 3A and 3B, FIG. 3D a modification of the fluid-technical equivalent circuit diagram according to FIG. 3B with two separate color changers for the two printheads, and FIG. 4A-4D various illustrations to explain the various flushing options.

FIG. 2A shows a modification of the example according to FIG. 1, so that in order to avoid repetitions, reference is made to the above description, whereby the same reference signs are used for the corresponding details.

A feature of this example is that the wet deposit device 10 is also designed as a cleaning device and contains cleaning nozzles 12 for spraying the deposited printhead 13 from the outside with a cleaning liquid (e.g. thinner).

Another feature of this example is that the wet deposit device 10 contains a docking device 14 which can establish a flow connection with the deposited printhead 13. Thus the printhead 13 has an inlet in order to be able to introduce liquid (e.g. paint, rinsing agent) into the printhead 13. In addition, the printhead 13 has an outlet for discharging the liquid (e.g. paint, rinsing agent) from the printhead 13. The docking device 14 can now dock to the inlet and outlet of the deposited printhead 13 so that fluid can circulate through the deposited printhead 13 via circulation lines 15, 16.

For example, the same paint that was previously applied by the printhead 13 can then flow through the deposited printhead 13 via the circulation lines 15, 16.

Alternatively, it is possible to carry out a color change using the docking device 14. In this case, the deposited printhead 13 is first rinsed with a rinsing agent via the circulation lines 15, 16 in order to clean the printhead 13. Then the deposited printhead 13 can be pre-filled with the new paint, so that the printhead 13 is immediately available for application with the new paint.

Figure 2B:
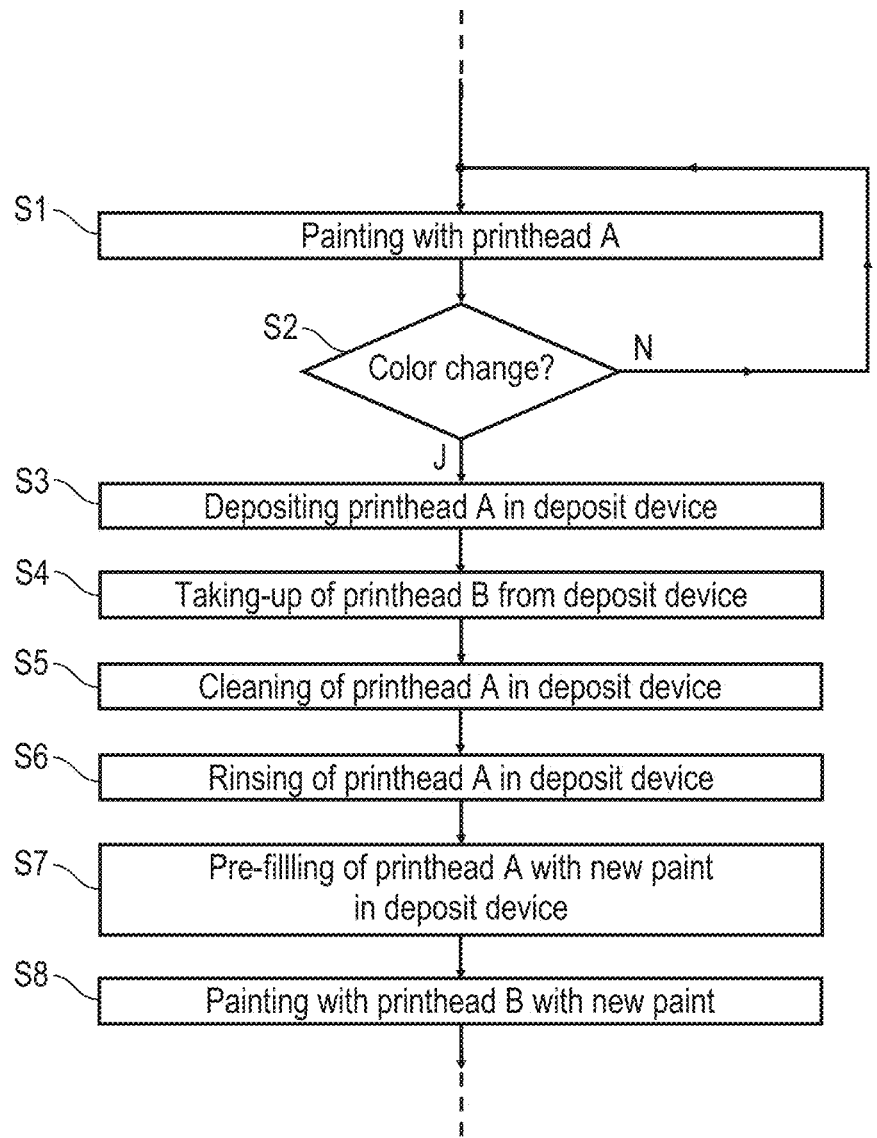

FIG. 2B shows the operating mode of the coating device according to FIG. 2A in a flowchart.

In a step S1, the coating is first carried out with a printhead A, which is mounted on the painting robot 3.

If it is determined in a step S2 that a color change is required, the mounted printhead A is then first deposited in a step S3 in the wet deposit device 10.

In a step S4, a printhead B from the wet deposit device 10 is then picked up by the painting robot 3.

The deposited printhead A is then cleaned in a step S5 in the wet deposit device 10 and rinsed in one step S6.

In step S7, the deposited printhead A is then pre-filled with a new paint.

Meanwhile, in a step S8, the new printhead B can already be coated with the new paint.

Figure 3A:
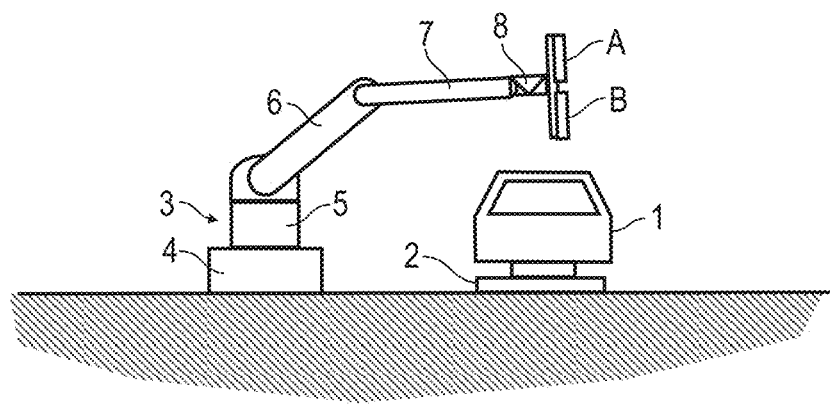
Figure 3B:
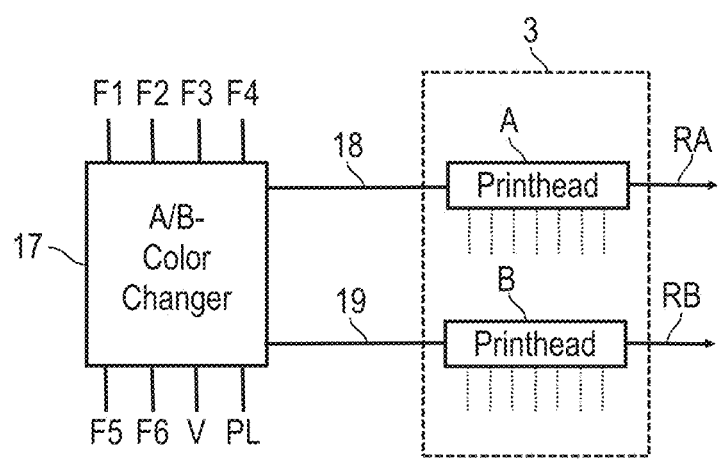
Figure 3C:
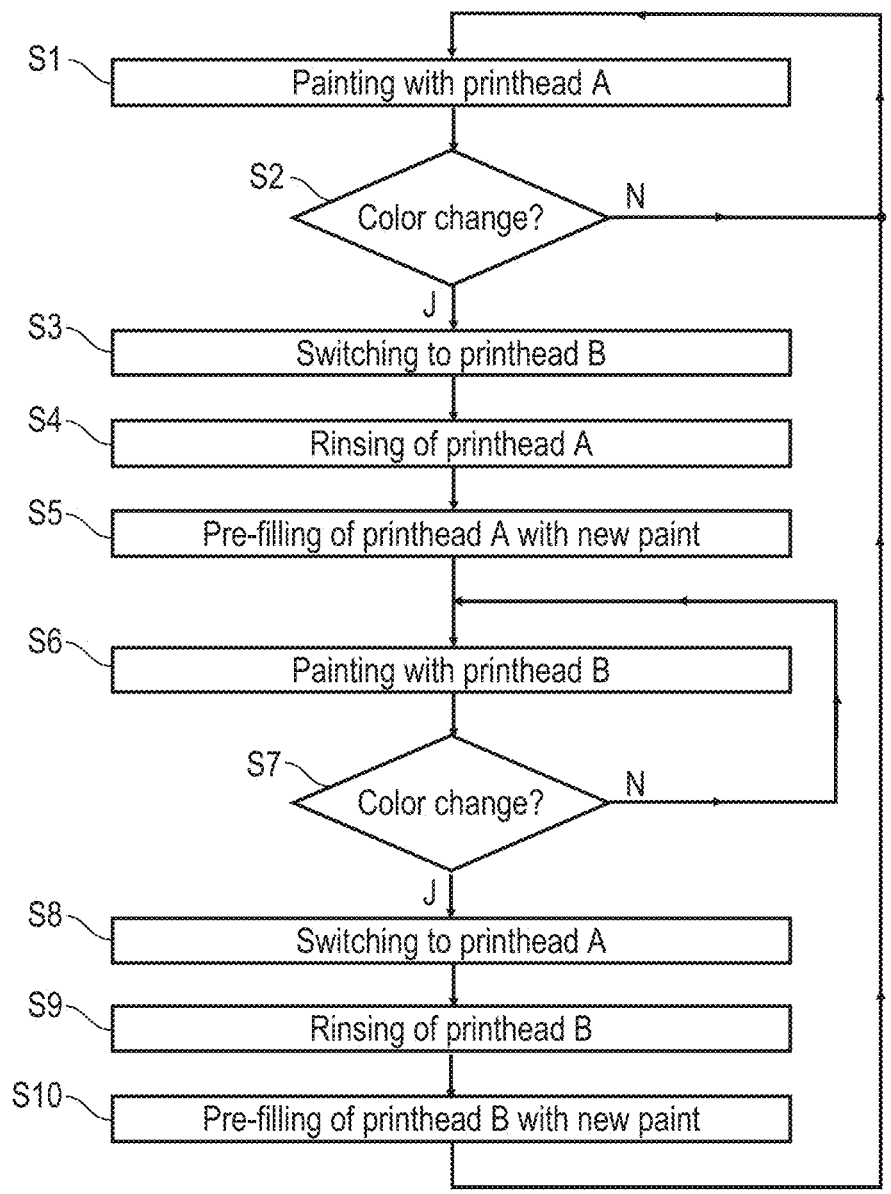

FIGS. 3A-3C are used to explain a variation of the example in FIGS. 2A and 2B so that to avoid repetition, reference is made to the above description, using the same reference signs for corresponding details.

A feature of this embodiment is that two printheads A, B are mounted on the painting robot 3, which enables a so-called A/B operation by means of an A/B color changer 17. The A/B color changer 17 is connected via two parallel color lines 18, 19 to the two printheads A, B, which can return the unneeded paint or rinsing agent residue to a return line RA or RB respectively.

FIG. 3C shows the function of the so-called A/B operation with the coating device according to FIGS. 3A and 3B.

In a first step S1, it is initially painted with the printhead A.

If it is then determined in step S2 that a color change is to take place, step S3 switches over to the other printhead B.

Then, in step S4, printhead A is rinsed and then pre-filled in step S5 with the desired new paint.

At the same time, a new coating can be applied without interruption with printhead B in step S6. Steps S4 and S5 therefore do not delay the color change, so that the coating can be applied almost without interruption during a color change.

If in step S7 it is then determined again that a new color change is to take place, then in step S8 it is switched to the printhead A again and the printhead B is rinsed at step S9 and pre-filled in step S10 with a new paint.

Figure 3D:
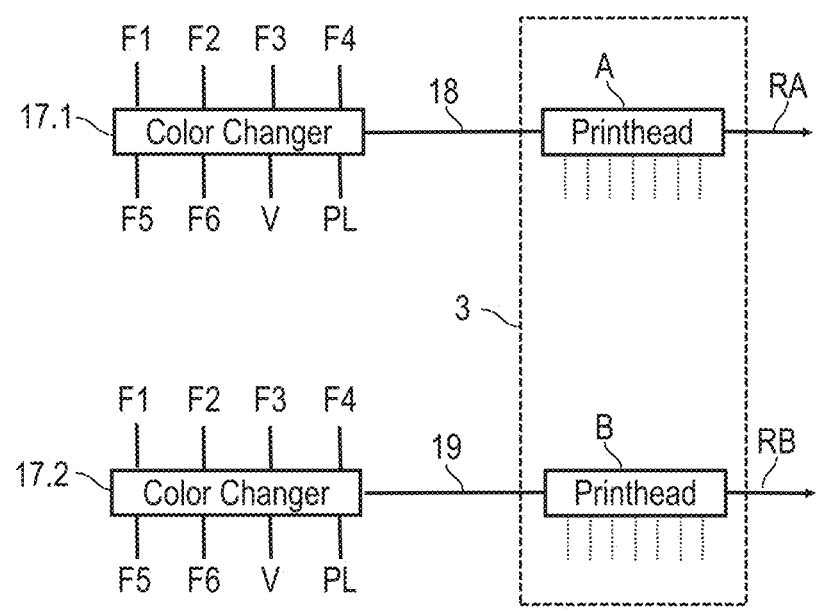

FIG. 3D shows a modification of the fluid equivalent schematic as shown in FIG. 3B, so that to avoid repetitions, reference is made to the above description, using the same reference signs for corresponding details.

A feature of this embodiment is that two separate color changers 17.1, 17.2 are provided instead of the A/B color changer 17.

FIGS. 4A-4D show a schematic diagram of a printhead with multiple printhead valves 20 to control coating delivery. The shown printhead has a nozzle plate 21 with numerous nozzles 22 which can be closed or opened by the individual printhead valves 20.

The individual printhead valves 20 are electrically controlled and operate magnetically. The printhead valves 20 each have a coil 23 wound onto a coil tube 24, the coil tube 24 having a coil core 25 and a movable armature 26. The armature 26 can be moved vertically in the drawing and is pressed by a return spring 27 into the closed position shown in the drawings, in which a seal 28 at the lower end of the armature 26 closes the nozzle 22.

To open the printhead valve 20, the coil 23 is energized in such a way that the armature 26 is pushed upwards in the drawing, so that the seal 28 releases the nozzle 22.

In addition, the individual printhead valves 20 each have a rinse ports 29 at the top end.

The printhead itself has an inlet 30 for supplying paint or rinsing agent and an outlet 31 for dispensing paint or rinsing agent.

As for the drawings in FIGS. 4A-4D, it should be noted that in the drawings all printhead valves 20 are shown in the closed state and the nozzles 22 then close. In fact, however, the individual printhead valves 20 must open or close in order to perform the rinsing operations described below.

It should also be mentioned that the drawings show the flow path of the rinsing agent in the various rinsing processes by means of a large arrow.

Figure 4A:
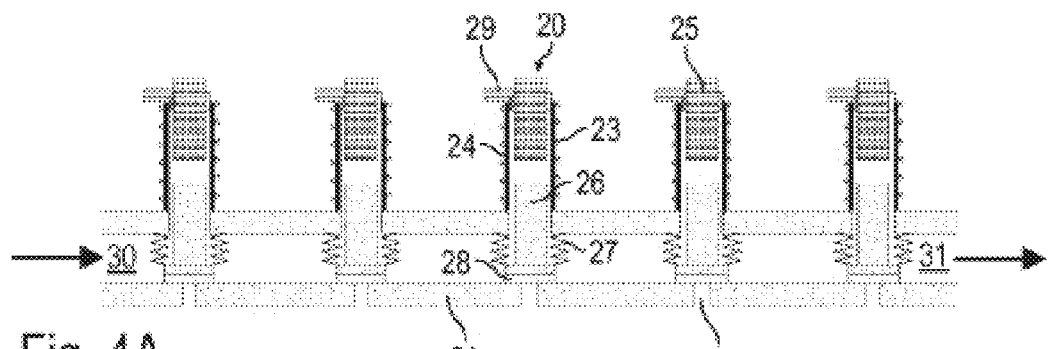

In FIG. 4A, the flushing fluid is introduced into the printhead through the inlet 30 and then leaves the printhead through the outlet 31 into the return, with all printhead valves 20 being closed.

Figure 4B:
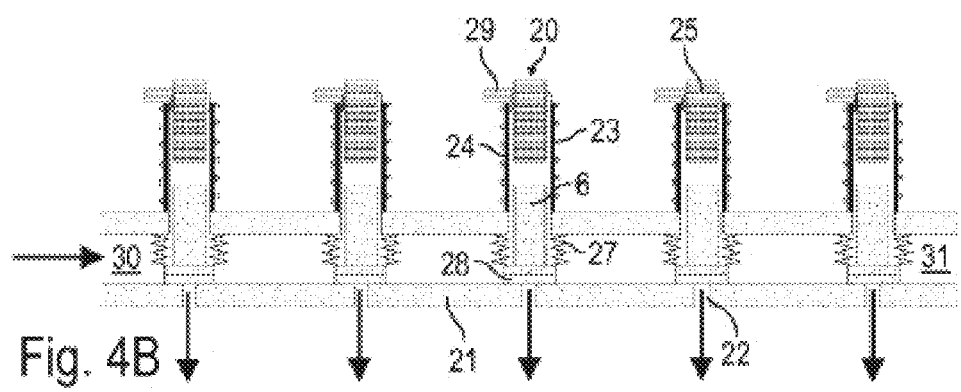

In the flushing procedure shown in FIG. 4B, the flushing fluid is also fed into the printhead through the inlet 30 and then leaves the printhead through the nozzles 22. In this flushing procedure, the individual printhead valves 20 are opened which is different from the drawing.

Figure 4C:
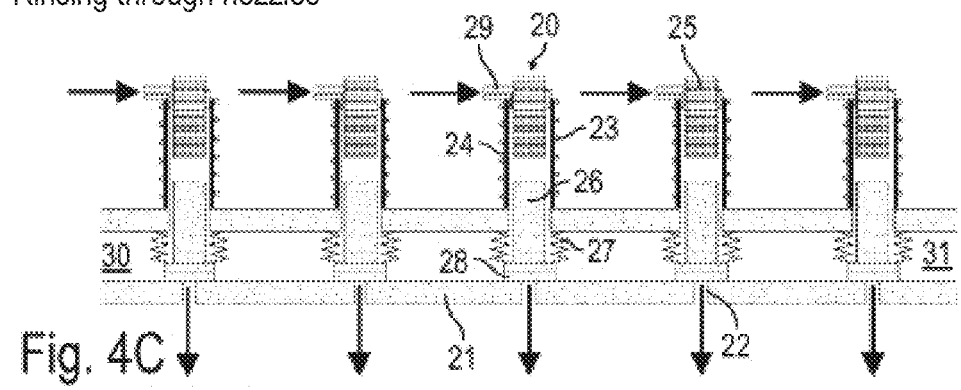

In the rinse operation shown in FIG. 4C, however, the rinsing agent is fed through rinse ports 29 of each printhead valve 20 and then leaves the printhead through nozzles 22. Again, each printhead valve 20 release nozzle 22 differently from the drawing.

Figure 4D:
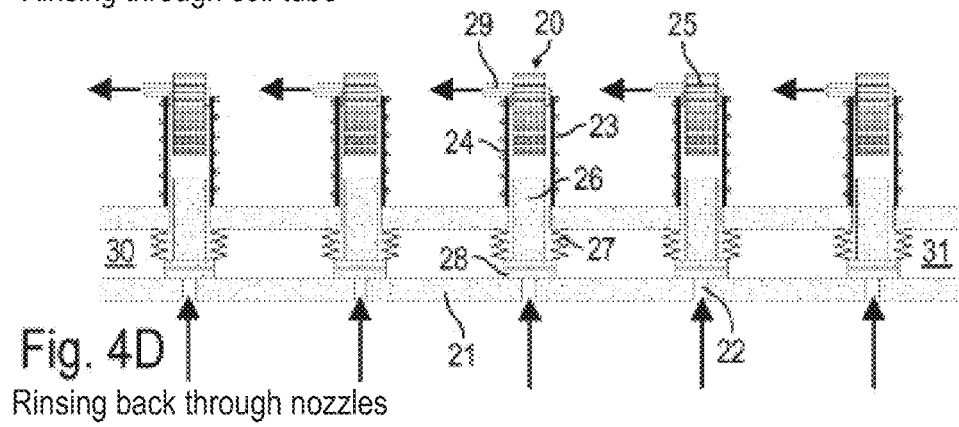

In the flushing procedure shown in FIG. 4D, however, the rinsing agent is introduced in the reverse direction through the open nozzles 22 and then leaves the printhead via the rinse ports 29 of the individual printhead valves 20 and/or (not shown) via the return. Thus, within the scope of the disclosure, there is the possibility that the coil tubes 24 of the individual printhead valves 20 can be flowed through bidirectionally by flushing medium in order to achieve a good flushing effect.

The disclosure is not limited to the preferred embodiments described above. Rather, a large number of variants and modifications are possible which also make use of the disclosure and therefore fall within the scope of protection. In particular, the disclosure also claims protection for the subject-matter and the features of the dependent claims independently of the claims referred to in each case and in particular also without the features of the main claim. The disclosure thus comprises a large number of different aspects which enjoy protection independently of each other.

LIST OF REFERENCE SIGNS

1 Motor vehicle body component
2 Conveyors

3 Painting robots
4 Robot base
5 Rotatable robot link
6 Proximal robot arm ("Arm 1")
7 Distal robot arm ("Arm 2")
8 Robot hand axis
9 Printhead
10 Wet deposit device
11 Liquid bath
12 Cleaning nozzles in the wet deposit device
13 Deposited printhead in the wet deposit device
14 Docking device in the wet deposit device
15 Circulation line in the wet deposit device
16 Circulation line in the wet deposit device
17 A/B color changer
17.1 Color changer
17.2 Color changer
18 Color lines
19 Color lines
20 Printhead valves
21 Nozzle plate
22 Nozzles
23 Coil
24 Coil tube
25 Coil core
26 Armature
27 Return spring
28 Seal
29 Rinse ports
30 Printhead inlet
31 Printhead outlet
A, B Printheads
F1-F6 Color lines
PL Pulse air line
V Thinner line
RA, RB Return lines

The invention claimed is:

1. A coating device for coating components with a coating agent, comprising:
   a) a multi-axis coating robot,
   b) a first printhead with
      b1) a nozzle for delivering a coating agent jet of the coating agent from the nozzle onto the surface of the component to be coated, and
      b2) a printhead valve for controlling the release of the coating agent through the nozzle,
      b3) wherein the first printhead is mounted on the coating robot and is guided by the coating robot over the surface of the component to be coated,
   c) wherein in addition to said first printhead, a second printhead identical to the first printhead is mounted on said coating robot, said two printheads each applying a designated coating agent to enable color change without printhead replacement, and
   d) a color changer that provides a plurality of different colors of coating agent and provides a rinsing agent, the color changer operably connected to the first printhead, the color changer operable to provide rinsing agent to the first printhead while the second printhead applies coating agent.

2. The coating device according to claim 1, wherein
   a) a first coating agent circuit passes through the first printhead,
   b) a second coating agent circuit passes through the second printhead.

3. The coating device according to claim 1, wherein
   a) a cleaning device is provided for cleaning at least one of the first printhead and the second printhead,
   b) the cleaning device is arranged in a stationary manner separately from the coating robot, and
   c) the coating robot introduces at least one of the first and the second printhead into the cleaning device to clean at least one of the first and the second printhead in the cleaning device.

4. The coating device according to claim 1, wherein
   a) said first printhead is capable of applying coating agent while said second printhead is flushed with said rinsing agent, and
   b) said second printhead is capable of applying coating agent while said first printhead is flushed with said rinsing agent, and
   c) in that the two printheads are each rinsed alternately with the rinsing agent and apply coating agents.

5. The coating device according to claim 1, wherein
   a) a short color change time is required for a color change, the color change time being shorter than 30 s,
   b) a color change results in a low coating loss of less than 2 l; and
   c) a color change results in a low rinsing agent requirement of less than 2 l.

6. The coating device in accordance with claim 1, wherein the first and second printhead emits a narrowly limited jet of coating agent in contrast to a spray mist.

7. The coating device in accordance with claim 6, wherein the coating agent pressure is controlled with a maximum variation of 500 mbar.

8. The coating device in accordance with claim 7, wherein the first and second printhead has an application efficiency of at least 95% so that substantially all of the applied coating agent is completely deposited on the component without overspray.

9. The coating device in accordance with claim 8, wherein the first and second printhead has an area coating capacity of at least 0.5 m$^2$/min.

10. The coating device in accordance with claim 9, wherein a volume flow of the applied coating agent and thus the exit velocity of the coating agent is set in such a way that the coating agent does not bounce off the component after it hits the component.

11. The coating device in accordance with claim 9, wherein the exit velocity of the coating agent from the first and/or second printhead is at least 5 m/s.

12. The coating device in accordance with claim 11, wherein the exit velocity of the coating agent from the first and/or second printhead is not more than 30 m/s.

13. The coating device in accordance with claim 12, wherein
   a) that the application distance is at least 4 mm; and
   b) that the application distance is not more than 200 mm.

14. The coating device of claim 1, wherein the color changer is operably connected to both the first printhead and the second printhead.

15. The coating device of claim 1, further comprising a second color changer operably connected to the second printhead.

16. The coating device of claim 1, wherein the color changer is operably connected to the first printhead with a plurality of color hoses, the color changer configured to provide one color from each hose to the first printhead, and wherein the color changer is operably connected to the first printhead to provide the rinse agent via a rinsing agent connection separate from the plurality of hoses.

* * * * *